United States Patent
Hsieh

(10) Patent No.: US 8,950,693 B2
(45) Date of Patent: Feb. 10, 2015

(54) SPRAY GUN WITH ROTARY VALVE

(75) Inventor: Pai-Chou Hsieh, Chang-Hua County (TW)

(73) Assignee: Yuan Pin Industrial Co., Ltd., Chang-Hua (TW)

( * ) Notice: Subject to any disclaimer, the term of this patent is extended or adjusted under 35 U.S.C. 154(b) by 217 days.

(21) Appl. No.: 13/592,517

(22) Filed: Aug. 23, 2012

(65) Prior Publication Data

US 2014/0054399 A1 Feb. 27, 2014

(51) Int. Cl.
*B05B 7/02* (2006.01)
*B05B 9/01* (2006.01)
*F16K 27/06* (2006.01)
*B05B 12/00* (2006.01)

(52) U.S. Cl.
CPC ............ *B05B 9/01* (2013.01); *F16K 27/065* (2013.01); *B05B 12/002* (2013.01)
USPC ........ 239/526; 239/581.1; 239/583; 239/569; 239/525; 239/586; 251/309; 251/312

(58) Field of Classification Search
CPC ...... B05B 9/01; B05B 12/002; B05B 1/3013; F16K 27/065
USPC .............. 239/526, 525, 581.1, 583, 569, 586; 251/309–312
See application file for complete search history.

(56) References Cited

U.S. PATENT DOCUMENTS

| | | | | |
|---|---|---|---|---|
| 4,173,328 A | * | 11/1979 | Karbo | 251/309 |
| 5,234,193 A | * | 8/1993 | Neal et al. | 251/175 |
| 7,328,860 B1 | * | 2/2008 | Chen | 239/581.1 |
| 2006/0266851 A1 | * | 11/2006 | Wang | 239/526 |

* cited by examiner

*Primary Examiner* — Jason Boeckmann
*Assistant Examiner* — Joel Zhou
(74) *Attorney, Agent, or Firm* — Alan D. Kamrath; Kamrath IP Lawfirm, P.A.

(57) ABSTRACT

A spray gun includes a gun body, a rotary plug and a button. The gun body has a valve seat extending between an inlet passage and an outlet passage thereof. The plug is accommodated in a chamber of the valve seat and has a fluid path, with the plug rotatable between an open position where the fluid path joins the inlet passage and the outlet passage and a closed position where the plug separates the inlet passage from the outlet passage. The button has two lobes joined to opposite ends of the plug. An elastomeric seal ring is sleeved around the plug. A backup ring adjacent to the seal ring is sleeved around the plug. The seal ring and the backup ring are held between a shoulder of the valve seat and the respective lobe of the button.

5 Claims, 8 Drawing Sheets

SPRAY GUN WITH ROTARY VALVE

BACKGROUND OF THE INVENTION

1. Field of the Invention

This invention relates to a spray gun for dispensing fluids, such as liquids and gases, and, more particularly, to a spray gun with a rotary valve which can be maneuvered easily.

2. Description of the Related Art

FIG. 9 illustrates a conventional spray gun 900 which generally includes a spray gun body 91 including a valve seat 92 in which a rotary plug 95 is seated. A control button 90 is joined to opposite ends of the plug 95, so that the button 90 is operable to control rotation of the plug 95. A seat seal 97 is seated in a trough 98 in a cylindrical exterior surface of the plug 95, so that when the plug 95 is disposed in a closed position where the fluid path is disconnected with inlet and outlet passages (not shown) in the spray gun body 91, the seat seal 97 seals the inlet passage or the outlet passage against fluid leakage. Moreover, two O rings 93, 96 are seated in the annular grooves of the plug 95 to seal leak paths which would otherwise be present between the valve seat 92 and the plug 95. However, the sealing requires the O-rings 93, 96 tightly bearing against an inner wall of the valve seat 92, and, thus, manipulation of the button 90 together with the plug 95 to swing becomes harder (with much more force than necessary).

SUMMARY OF THE INVENTION

The present invention provides an improved spray gun to solve the problems mentioned above. That is, the spray gun has a rotary plug and a control button capable of being maneuvered to control rotation of the rotary plug in a relatively smooth way.

The spray gun mainly includes a spray gun body, a rotary cylindrical plug accommodated in a valve seat of the gun body, a control button operable to control rotation of the plug, a pair of seal rings and a pair of backup rings sleeved around the plug. The spray gun body defines therein an inlet passage and an outlet passage. The valve seat extends in between the inlet passage and the outlet passage of the gun body, and defines a chamber having an intermediate section and two opposite enlarged open ends, therefore, forming two shoulders at the junctions of the intermediate section and the respective enlarged open ends.

The plug is accommodated in the chamber of the valve seat and has a fluid path laterally defined in the plug. Thus, the plug is rotatable in the chamber of the valve seat between an open position where the fluid path of the plug joins the inlet passage and the outlet passage of the spray gun body to allow fluid flow therethrough and a closed position where the plug separates the inlet passage from the outlet passage of the spray gun body to prevent fluid flow therethrough. The button includes a pair of lobes joined to opposite ends of the plug and a linking member connecting the two lobes, such that the button is manually operable from outside the valve seat for controlling the rotation of the plug.

The seal rings and the backup rings are provided to seal the spray gun body against external leakage of fluid. Specifically, the seal rings, which are formed of an elastomeric material, are received in the opposite enlarged open ends of the chamber of the valve seat, and the backup rings are also received in the enlarged open ends on the opposite sides of the seal rings, such that the seal rings and the backup rings are respectively held between the shoulders of the valve seat and inner side walls of the lobes of the button. It is noted that the backup rings are provided to reduce friction between the seal rings and the lobes of the button. Preferably, the backup rings are formed of a low friction material, such as a polyfluorocarbon material. A preferred example is polytetrafluoroethylene, often referred to as PTFE. The most well-known brand name of PTFE is Teflon by DuPont Co.

Unlike the prior art, the seal rings and the backup rings of this invention are located in the enlarged open ends in the valve seat, rather than in the plug. The seal rings and the backup rings not only abut against the cylindrical surface of the plug to provide a first leakproof effect but also together seal leak paths which would otherwise be present between the valve seat and the lobes of the button. That is, a second leakproof effect is provided by the seal rings sealing against the shoulders of the valve seat and by the backup rings sealing against the inner side walls of the lobes of the button to seal fluid in the chamber of the valve seat from the exterior of the spray gun. With the double leakproof effects, the seal rings and the backup rings do not have to tightly bear against the cylindrical surface of the plug as the prior art does, and, therefore, the rotation of the plug can be relatively easier. Moreover, since the backup rings are not located in the rotary plug, the backup rings can be easily assembled in the valve seat and do not have to be split in order to allow assembly of the rings in grooves of the rotary plug.

On the other hand, the linking member of the button includes an upper elongated portion, a lower elongated portion and a separately molded middle elongated piece detachably engaged between the upper and lower elongated portions. The upper and lower elongated portions of the linking member are formed integrally with the lobes respectively. One of the lobes of the button is formed integrally to one end of the plug, and the opposite lobe of the button is connected with the opposite end of the plug. As such, the middle elongated piece of the linking member may be colored to be different from the upper or lower elongated portion, without the use of a secondary injection molding process, to provide a unique appearance for the spray gun.

Further benefits and advantages of the present invention will become apparent after a careful reading of the detailed description with appropriate reference to the accompanying drawings.

DETAILED DESCRIPTION OF THE PREFERRED EMBODIMENTS

Referring to FIGS. 1-8, a spray gun 100 is provided in accordance with the preferred embodiment of this invention.

Figure 1:
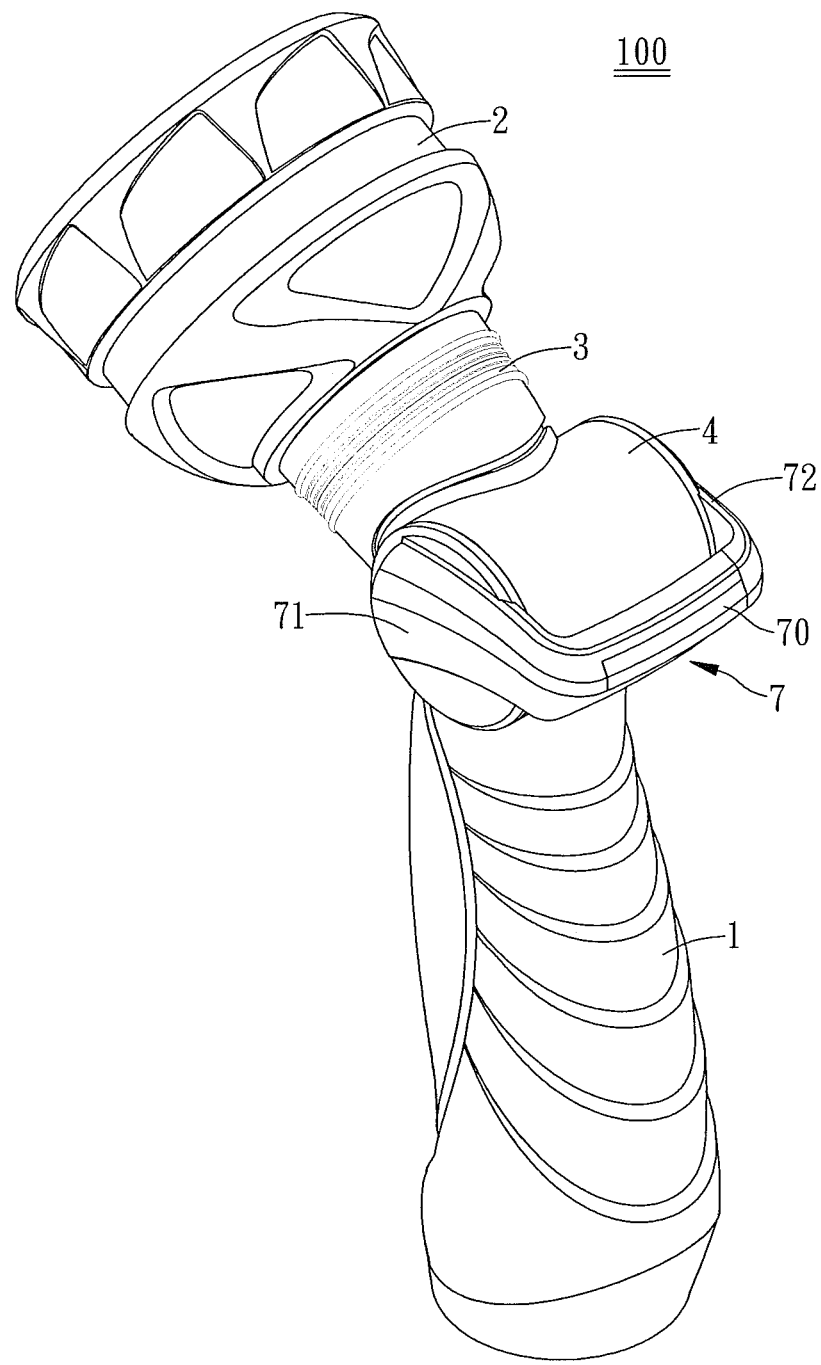
FIG. 1 is a perspective view of a spray gun in accordance with the preferred embodiment of the present invention.
Figure 2:
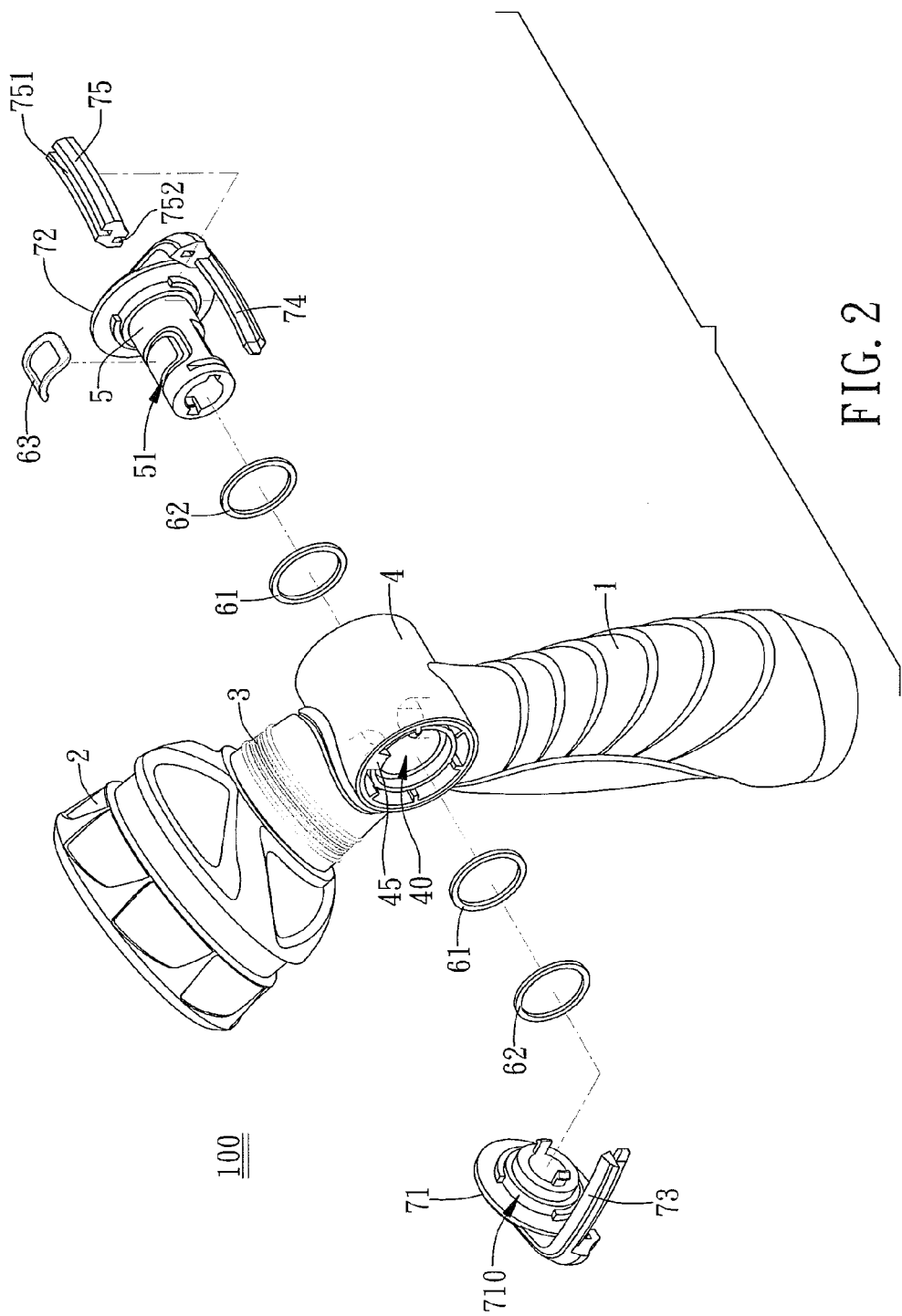
FIG. 2 is an exploded perspective view of the spray gun shown in FIG. 1.

As shown in FIG. 1, the spray gun 100 includes a spray head 2 and a spray gun body including a handle 1, a retaining portion 3 and a valve seat 4 extending between the handle 1 and the retaining portion 3. As shown in FIG. 2, a rotary valve is also included in the spray gun 100 and includes the valve seat 4, a rotary cylindrical plug 5 accommodated in the valve seat 4, a pair of seal rings 61 sleeved around the plug 5, a pair of backup rings 62 on opposite sides of the seal rings 61, a seat seal 63 seated in a trough 51 defined in a cylindrical exterior surface of the plug 5, and a control button 7.

Figure 3:
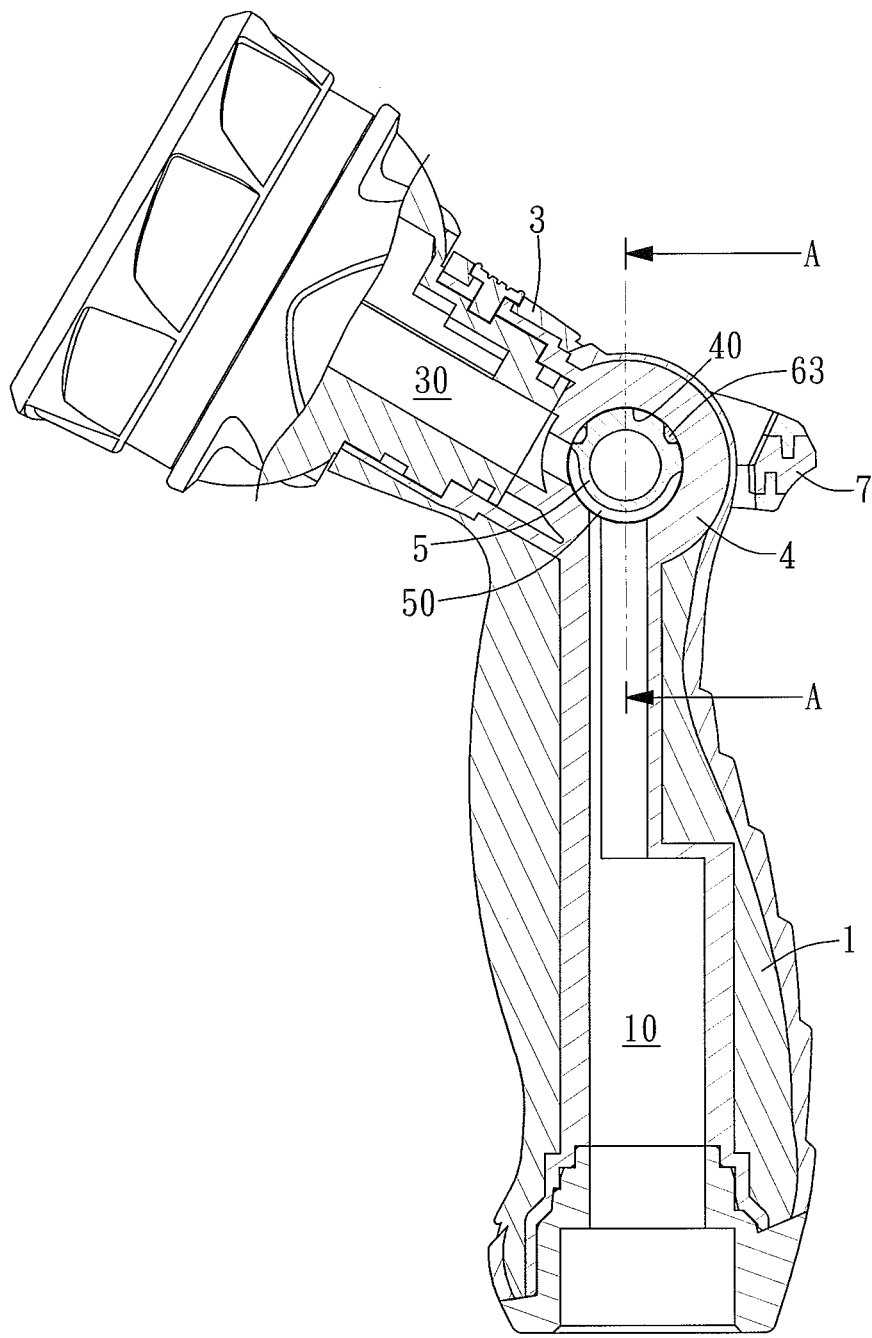
FIG. 3 is, for the most part, a cross-sectional view of the spray gun shown in FIG. 1.
Figure 5:
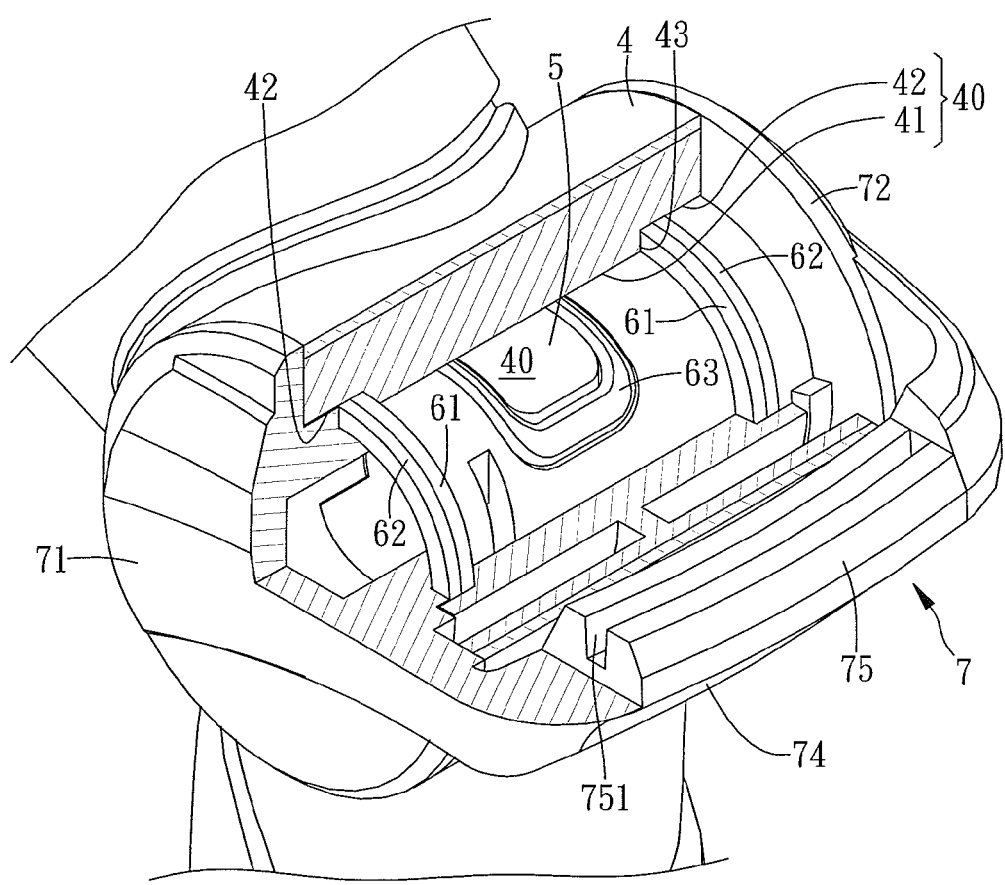
FIG. 5 is a partial enlarged perspective view of the spray gun shown in FIG. 1, partially broken away to show the detail of the rotary valve.
Figure 6:
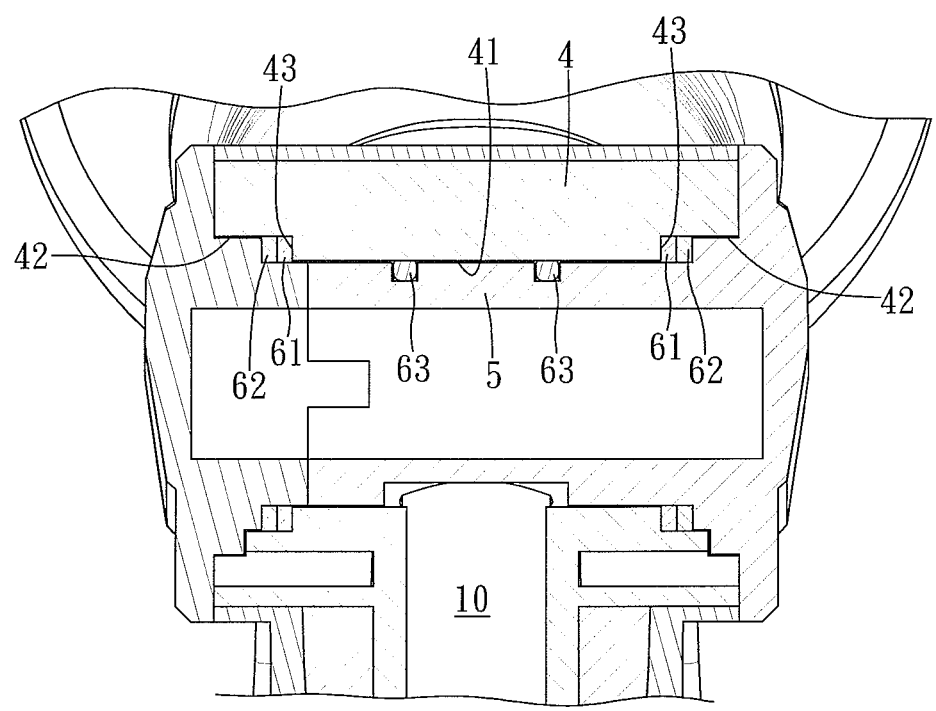
FIG. 6 is a cross sectional view taken along the line A-A of FIG. 3.
Figure 7:
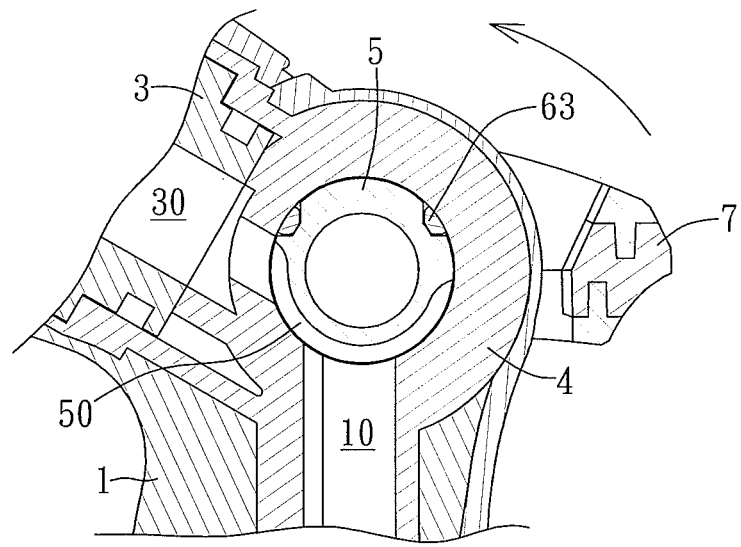
FIG. 7 is a partial enlarged view of the spray gun shown in FIG. 3, showing a plug of the rotary valve in an open position.

As shown in FIG. 3, the handle 1 of the spray gun body defines therein an inlet passage 10 for connection with a suitable source of fluid (not shown). The retaining portion 3 of the spray gun body is connected with the spray head 2 and defines therein an outlet passage 30. The valve seat 4 of the rotary valve extends between the inlet passage 10 and the outlet passage 30. Referring to FIG. 5 or 6, the valve seat 4 defines a chamber 40 including an intermediate section 41 and two opposite enlarged open ends 42, and therefore has two shoulders 43 each formed at the junction of the intermediate section 41 and the respective enlarged open end 42.

Figure 4:
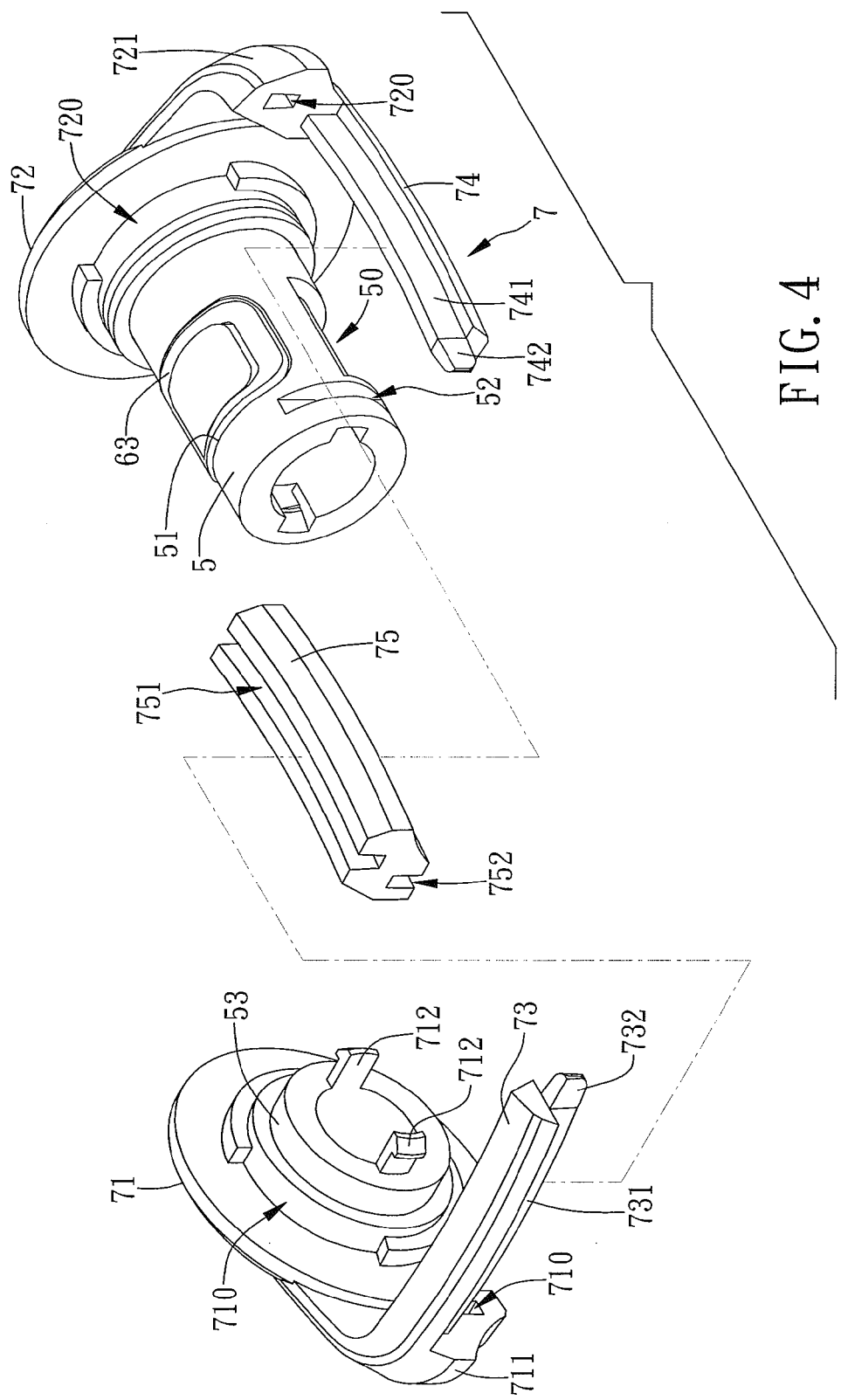
FIG. 4 is a partial enlarged exploded perspective view of a rotary valve of the spray gun shown in FIG. 1.
Figure 8:
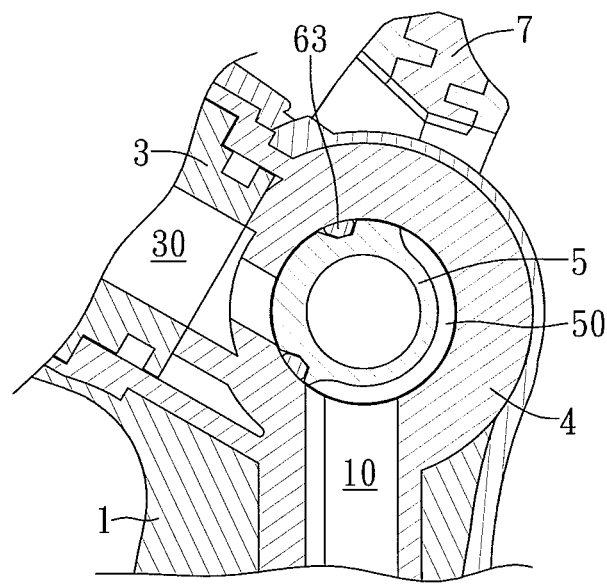
FIG. 8 is a view similar to FIG. 7, showing the plug of the rotary valve in a closed position.
Figure 9:
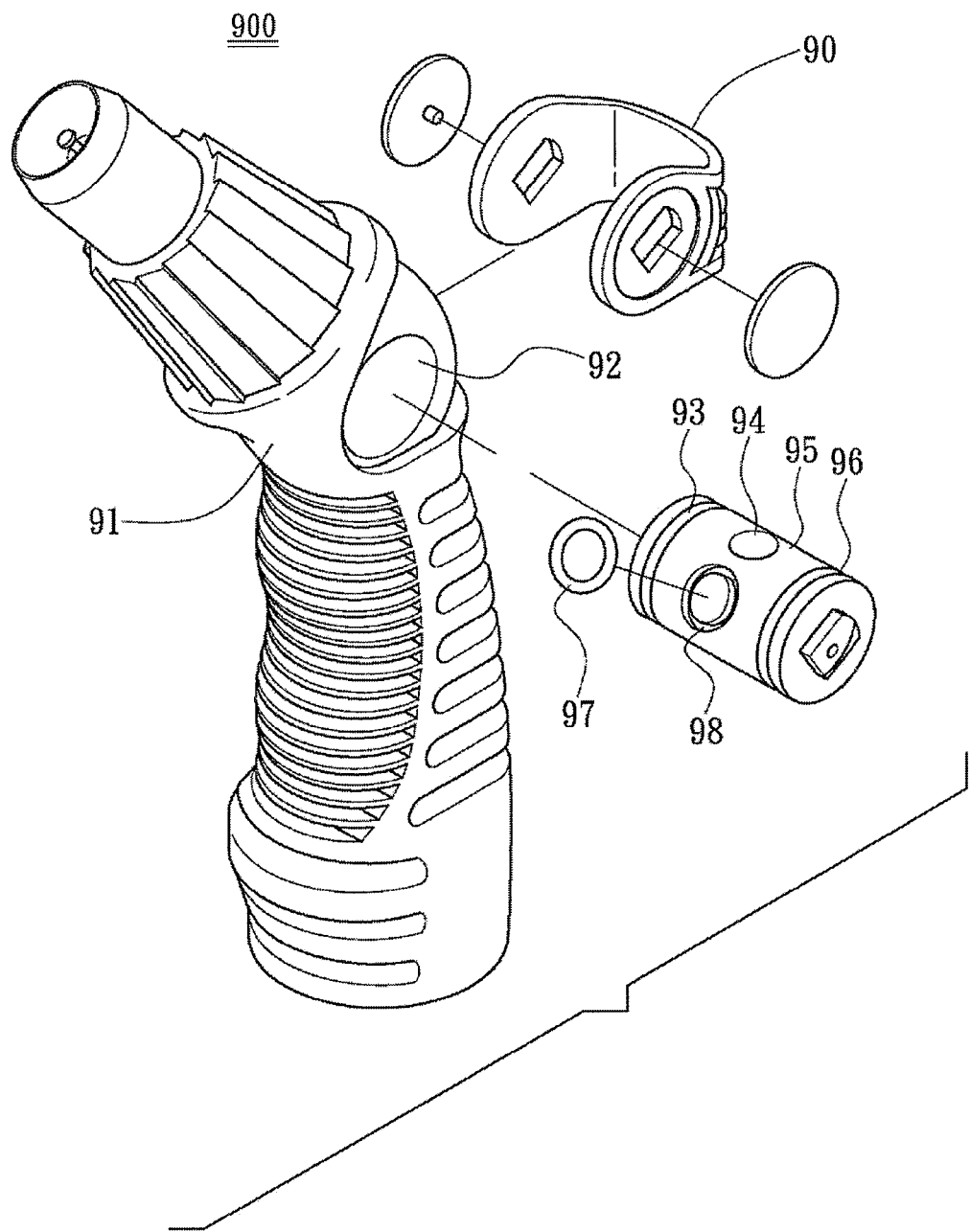
FIG. 9 is an exploded perspective view of prior art.

As shown in FIG. 5 or 6, the rotary plug 5 is accommodated in the chamber 40 of the valve seat 4 and closely matches the inside diameter of the chamber 40. As shown in FIG. 3 or 4, the plug 5 has a fluid path 50 laterally defined in the plug 5, so that the plug 5 is rotatable in the chamber 40 of the valve seat 4 between an open position (FIG. 7) where the fluid path 50 of the plug 5 joins the inlet passage 10 of the handle 1 and the outlet passage 30 of the retaining portion 3 to allow fluid flow therethrough and a closed position (FIG. 8) where the plug 5 separates the inlet passage 10 from the outlet passage 30 of the spray gun body to prevent fluid flow therethrough. As shown in FIG. 8, when the plug 5 is disposed in the closed position, the seat seal 63 together with the trough 51 of the plug 5 extends adjacent and around either the inlet passage 10 of the handle 1 (or the outlet passage 30 of the retaining portion 3, in another example) to seal the respective inlet passage 10 (or the outlet passage 30) against fluid leakage.

As shown in FIGS. 1 and 4, the button 7 includes a pair of lobes 71, 72 joined to opposite ends of the plug 5 and a linking member 70 connecting the two lobes 71, 72, such that the button 7 is operable from outside of the valve seat 4 to control the rotation of the plug 5. The rotation of the button 7 is confined in a predetermined range by stops 45 (FIG. 2) of the valve seat 4 located in positioning holes 710, 720 in the lobes 71, 72 of the button 7. Specifically, the linking member 70 of the button 7 includes an upper elongated portion 73 integrally extending from an edge of the left lobe 71, a lower elongated portion 74 integrally extending from an edge of the right lobe 72 and a separately molded middle elongated piece 75 engaged in between the upper and lower elongated portions 73, 74. Accordingly, the middle elongated piece 75 has a color different from that of the upper or lower elongated portion 73 or 74, without utilizing a secondary injection molding process, to provide a unique appearance for the spray gun 100.

In the illustrated embodiment, the main portion of the plug 5, the right lobe 72 and the lower elongated portion 74 of the linking member 70 are formed integrally in one piece, and the left lobe 71 and the upper elongated portion 73 of the linking member 70 are formed integrally in one piece. The left lobe 71 of the button 7 is connected with the opposite end portion 53 of the plug 5, and the end portion 53 of the plug 5 is fastened to the main portion of plug 5 by hooks 712 in the respective holes 52 of the plug 5.

More specifically, the middle elongated piece 75 of the linking member 70 of the button 7 defines an upper elongated groove 751 in a top and a lower elongated groove 752 in a bottom. The upper elongated portion 73 of the linking member 70 is integrally formed with a lower positioning key 731 embedded in the upper elongated groove 751 of the middle elongated piece 75 and a bolt 732 extending from a free end of the lower positioning key 731. Similarly, the lower elongated portion 74 of the linking member 70 is integrally formed with an upper positioning key 741 embedded in the lower elongated groove 752 of the middle piece and a bolt 742 extending from a free end of the upper positioning key 741. On the other hand, the lobes 71, 72 have extensions 711 or 721 each defining in an inner side wall the positioning hole 710 or 720 dimensioned to receive a respective one of the bolts 732, 742 of the upper and lower elongated portions 73, 74 of the linking member 70. That is, the bolt 742 of the lower elongated portion 74 is fitted in the positioning hole 710 of the extension 711 of the left lobe 71, and the bolt 732 of the upper elongated portion 73 is fitted in the positioning hole 720 of the right lobe 72.

The seal rings 61 and the backup rings 62 are provided to seal the spray gun body against external leakage of fluid. Referring to FIG. 5 or 6, the seal rings 61, which are formed of an elastomeric material such as rubber, are received in the enlarged open ends 42 of the chamber 40 of the valve seat 4. The backup rings 62 are also received in the enlarged open ends 42 of the chamber 40 on the opposite sides of the seal rings 61. In particular, the seal rings 61 and the backup rings 62 are respectively held between the shoulders 43 of the valve seat 4 and inner side walls of the lobes 71, 72 of the button 7 and therefor have an advantage, which will be discussed later. It is noted that the backup rings 62 are provided to reduce friction between the seal rings 61 and the lobes 71, 72 of the button 7. Preferably, the backup rings 62 are formed of a low friction material, such as a polyfluorocarbon material. A preferred example is polytetrafluoroethylene, often referred to as PTFE. The most well-known brand name of PTFE is Teflon by DuPont Co.

As shown in FIG. 6, the seal rings 61 and the backup rings 62 each has a substantially rectangular cross section to reduce the friction on the exterior surface of the plug 5. Unlike the prior art, the seal rings 61 and the backup rings 62 of this invention are located in the enlarged open ends 42 in the valve seat 4, rather than in the plug 5. The seal rings 61 and the backup rings 62 not only abut against the cylindrical exterior surface of the plug 5 to provide a first leakproof effect but also together seal leak paths which would otherwise be present between the valve seat 4 and the lobes 71, 72 of the button 7. That is, a second leakproof effect is provided by the seal rings 61 sealing against the shoulders 43 of the valve seat 4 and by the backup rings 62 sealing against the inner side walls of the lobes 71, 72 of the button 7 to seal fluid in the chamber 40 of the valve seat 4 from the exterior of the spray gun 100. With the double leakproof effects, the seal rings 61 and the backup rings 62 do not have to tightly bear against the cylindrical surface of the plug 5 as the prior art does, and therefor; the rotation of the plug 5 can be relatively easier. Besides, since the backup rings 62 are not located in the plug 5, the backup rings 62 do not have to be split in order to allow assembly of the backup rings 62 in grooves of the plug 5.

It is to be understood that the disclosed embodiments are illustrative in nature, and the invention is not to be limited to any one or more embodiments except as set forth in the following claims.

What is claimed is:

1. A spray gun comprising:
   a spray gun body having an inlet passage, an outlet passage and a valve seat extending between the inlet passage and the outlet passage, with the valve seat defining a chamber having an intermediate section and two opposite enlarged open ends, with the valve seat having two shoulders each defined at a junction of the intermediate section and a respective enlarged open end;

a rotary cylindrical plug accommodated in the chamber of the valve seat and having a fluid path laterally defined in the plug, wherein the rotary cylindrical plug is rotatable in the chamber of the valve seat between an open position where the fluid path of the plug joins the inlet passage and the outlet passage of the spray gun body to allow fluid flow therethrough and a closed position where the rotary cylindrical plug separates the inlet passage from the outlet passage of the spray gun body to prevent fluid flow therethrough;

a button having a pair of lobes joined to opposite ends of the rotary cylindrical plug and a linking member connecting the pair of lobes, wherein the button is operable to control rotation of the rotary cylindrical plug;

a pair of seal rings formed of an elastomeric material, sleeved around the rotary cylindrical plug and received in the two opposite enlarged open ends of the chamber of the valve seat; and a pair of backup rings formed of a polyfluorocarbon material, sleeved around the rotary cylindrical plug and received in the two opposite enlarged open ends of the chamber of the valve seat on the opposite sides of the pair of seal rings;

wherein the pair of seal rings and the pair of backup rings are respectively held between the two shoulders of the valve seat and inner side walls of the pair of lobes of the button, wherein the linking member of the button includes an upper elongated portion, a lower elongated portion and a separately molded middle elongated piece engaged between the upper and lower elongated portions; wherein the upper and lower elongated portions of the linking member are formed integrally with the pair of lobes of the button respectively; wherein one of the pair of lobes of the button is formed integrally to one end of the rotary cylindrical plug; and wherein another of the pair of lobes of the button is connected with another end of the rotary cylindrical plug.

2. The spray gun of claim 1, wherein the pair of backup rings have substantially rectangular cross sections.

3. The spray gun of claim 2, wherein the pair of seal rings have substantially rectangular cross sections.

4. The spray gun of claim 1 further comprising a seat seal, wherein the rotary cylindrical plug has a trough defined in a cylindrical exterior surface thereof, wherein the seat seal is seated in the trough, wherein when the rotary cylindrical plug is disposed in the closed position, the seat seal together with the trough of the plug extends adjacent and around either the inlet passage or the outlet passage of the spray gun body to seal the respective inlet passage or the outlet passage against fluid leakage.

5. The spray gun of claim 1, wherein the middle elongated piece of the linking member defines an upper groove in a top and a lower groove in a bottom; wherein the upper elongated portion of the linking member is integrally formed with a lower positioning key embedded in the upper groove of the middle elongated piece and a bolt extending from a free end of the lower positioning key; wherein the lower elongated portion of the linking member is integrally formed with an upper positioning key embedded in the lower groove of the middle piece and a bolt extending from a free end of the upper positioning key; and wherein each of the pair of lobes of the button has an extension defining in a side wall a positioning hole dimensioned to receive a respective one of the bolts of the upper and lower elongated portions of the linking member.

* * * * *